US008356300B2

(12) United States Patent
Sudzilouski et al.

(10) Patent No.: US 8,356,300 B2
(45) Date of Patent: Jan. 15, 2013

(54) MULTI-THREADED PROCESSES FOR OPENING AND SAVING DOCUMENTS

(75) Inventors: Uladzislau Sudzilouski, Sammamish, WA (US); Igor Zaika, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/569,595

(22) Filed: Aug. 8, 2012

(65) Prior Publication Data

US 2012/0297172 A1 Nov. 22, 2012

Related U.S. Application Data

(62) Division of application No. 12/147,925, filed on Jun. 27, 2008, now Pat. No. 8,255,905.

(51) Int. Cl.
*G06F 17/21* (2006.01)
(52) U.S. Cl. .............................. 718/1; 715/235; 715/200
(58) Field of Classification Search ........................ None
See application file for complete search history.

(56) References Cited

U.S. PATENT DOCUMENTS

| | | | |
|---|---|---|---|
| 6,014,681 A | 1/2000 | Walker et al. | |
| 6,493,000 B1 | 12/2002 | Wynn et al. | |
| 6,718,457 B2 | 4/2004 | Tremblay et al. | |
| 6,728,346 B2 | 4/2004 | Czyszczewski et al. | |
| 6,980,312 B1 * | 12/2005 | Czyszczewski et al. ...... | 358/1.15 |
| 7,219,198 B2 | 5/2007 | Sivaram et al. | |
| 7,289,964 B1 | 10/2007 | Bowman-Amuah | |
| 8,042,037 B1 | 10/2011 | Goel et al. | |
| 2001/0012095 A1 * | 8/2001 | Mui et al. ...................... | 355/40 |
| 2002/0087618 A1 | 7/2002 | Bohm et al. | |
| 2003/0050849 A1 * | 3/2003 | Keller et al. ..................... | 705/26 |
| 2006/0002520 A1 | 1/2006 | Bettis et al. | |
| 2007/0113171 A1 | 5/2007 | Behrens et al. | |
| 2007/0169123 A1 | 7/2007 | Hopkins | |
| 2007/0260667 A1 | 11/2007 | Duzak et al. | |
| 2007/0294665 A1 | 12/2007 | Papakipos et al. | |
| 2008/0244586 A1 | 10/2008 | Hopp | |
| 2010/0332973 A1 * | 12/2010 | Kloiber et al. ................ | 715/255 |
| 2011/0022941 A1 | 1/2011 | Osborne et al. | |

OTHER PUBLICATIONS

Office Action mailed Dec. 2, 2011 in U.S. Appl. No. 12/147,925.
Notice of Allowance mailed Apr. 17, 2012 in U.S. Appl. No. 12/147,925.

(Continued)

*Primary Examiner* — Idriss N Alrobaye
(74) *Attorney, Agent, or Firm* — Hope Baldauff Hartman, LLC

(57) ABSTRACT

Tools and techniques are described for multi-threaded processing for opening and saving documents. These tools may provide load processes for reading documents from storage devices, and for loading the documents into applications. These tools may spawn a load process thread for executing a given load process on a first processing unit, and an application thread may execute a given application on a second processing unit. A first pipeline may be created for executing the load process thread, with the first pipeline performing tasks associated with loading the document into the application. A second pipeline may be created for executing the application process thread, with the second pipeline performing tasks associated with operating on the documents. The tasks in the first pipeline are configured to pass tokens as input to the tasks in the second pipeline.

14 Claims, 7 Drawing Sheets

OTHER PUBLICATIONS

Kerns, "The Advantages of Multithreaded Applications," downloaded Apr. 25, 2008.

"Multi-threaded Calculation in Excel, or 'How Calculation Can Become Much Faster in Excel 12'", MSDN Blogs, downloaded Apr. 25, 2008.

Williams, "Improving Performance in Excel 2007", Oct. 2006, Microsoft Corporation.

Tang et al., "Compile/run-time Support for Threaded MPI Execution on Multiprogrammed Shared Memory Machines," Aug. 1999, ACM SIGPLAN Notices, 34(8): 107-118.

* cited by examiner

MULTI-THREADED PROCESSES FOR OPENING AND SAVING DOCUMENTS

CROSS-REFERENCE TO RELATED APPLICATIONS

This application is a divisional of co-pending application Ser. No. 12/147,925 entitled "Multi-Threaded Processes for Opening and Saving Documents," filed Jun. 27, 2008, which is incorporated herein by reference in its entirety.

BACKGROUND

Many different software applications are increasingly being adopted in a variety of different consumer and enterprise environments. Examples of these applications may include word processing, spreadsheet analysis, database management, contact management, presentation software, and the like. In addition, software applications are continually being updated and improved to handle increasingly rich content, as well as offering increased capabilities and functions. Typically, as these software applications evolve over time, the applications become more complex, and the size of the files on which the applications operate tends to increase. Some or all of these various factors may contribute to increasing the time involved in launching the application to edit a given file, as well as the time involved in saving edits to the given file.

SUMMARY

Tools and techniques are described for multi-threaded processing for opening and saving documents. These tools may provide load processes for reading documents from storage devices, and for loading the documents into applications. These tools may spawn a load process thread for executing a given load process on a first processing unit, and an application thread may execute a given application on a second processing unit. A first pipeline may be created for executing the load process thread, with the first pipeline performing tasks associated with loading the document into the application. A second pipeline may be created for executing the application process thread, with the second pipeline performing tasks associated with operating on the documents. The tasks in the first pipeline are configured to pass tokens as input to the tasks in the second pipeline.

The above-described subject matter may also be implemented as a method, computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
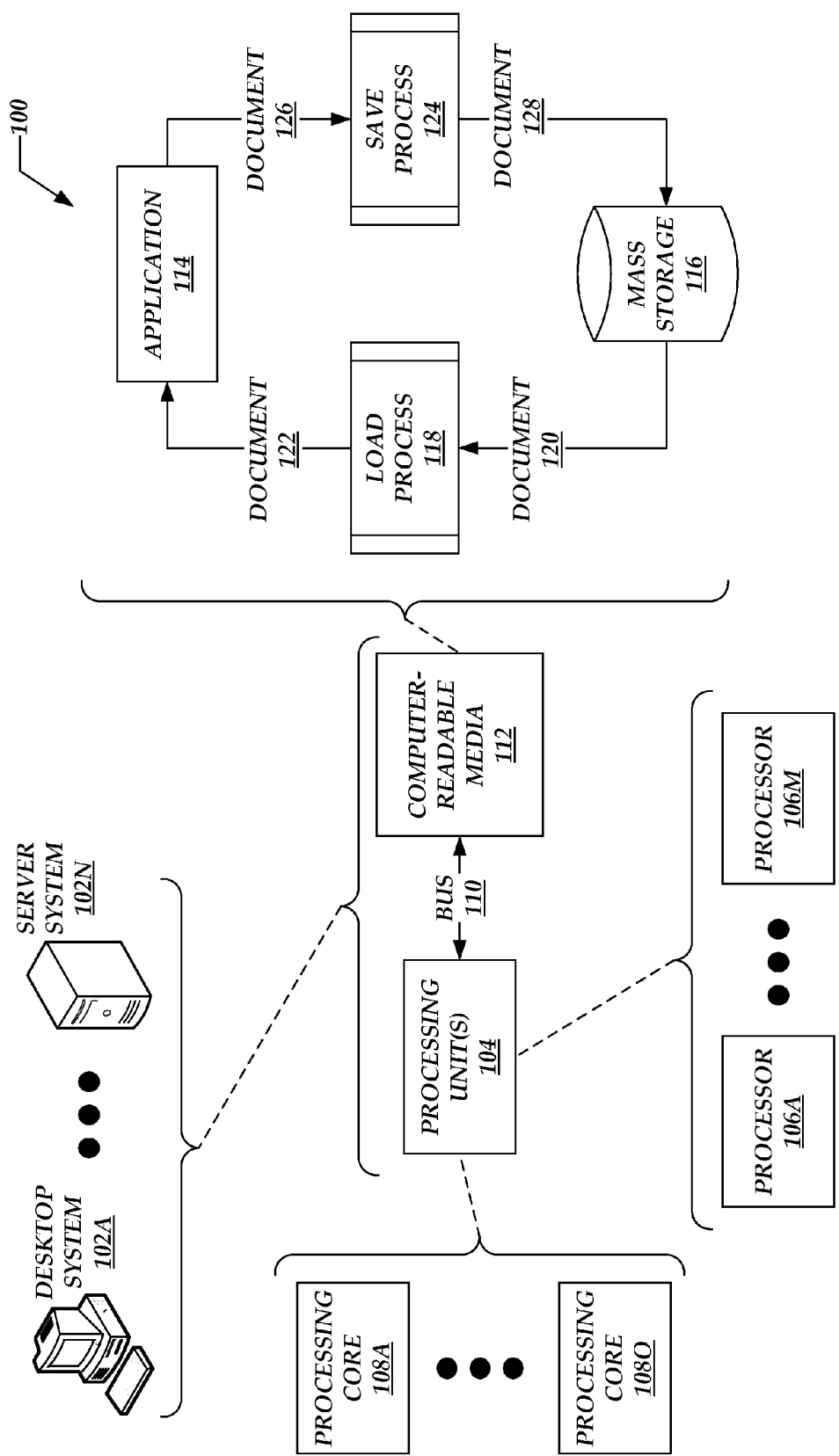
FIG. 1 is a combined block and flow diagram illustrating systems or operating environments for multi-threaded processes for opening and saving documents.

The following detailed description is directed to technologies for multi-threaded processes for parsing and generating rich formats when opening and saving documents. Examples of such rich formats may include, but are not limited to, extensible markup language (XML), hypertext markup language (HTML), rich text, and the like. While the examples described below may reference XML, it is noted that this description may be extended to any of the foregoing rich formats, as well as other rich formats not explicitly listed here.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of tools and techniques for multi-threaded processes for opening and saving documents will be described.

FIG. 1 illustrates systems or operating environments, denoted generally at 100, for multi-threaded processes for opening and saving documents. These systems 100 may include one or more desktop systems 102a, with FIG. 1 illustrating one desktop system 102a for clarity only. However, implementations of this description may include any number of desktop systems. In addition, these systems 100 may include server systems 102n, which may communicate with any number of desktop systems 102a over suitable communications networks (not shown). For ease of reference, and without limiting possible implementations, this description may refer to the desktop systems 102a and the server systems 102n collectively as desktop and server systems 102.

It is also noted that the description herein may be implemented in systems other than those shown in FIG. 1. For example, the description herein may be implemented in mobile devices, such as wireless-enabled laptops, personal digital assistants (PDAs), smart phones, and the like. However, in the interests of legibility and conciseness, FIG. 1 illustrates only the desktop systems 102a and server systems 102n.

Turning to the desktop and server systems 102 in more detail, these systems may include one or more processing units 104, which may have a particular type or architecture, chosen as appropriate for particular implementations. In some scenarios, processing units 104 may include multi-processor systems that further include any number of discrete processors or central processing units (CPUs) 106a and 106m (collectively, processors 106). In other scenarios, the processing units 104 may include a single CPU, that further includes multiple processing cores 108a and 108o (collectively, processing cores 108). Finally, in some cases, the processing units 104 may include single-CPU and/or single-core implementations as well. For ease of reference, this description may refer to processing cores 108 and processors 106 collectively as processing units 104.

The processing units 104 may couple to one or more bus systems 110 chosen for compatibility with the processing units 104. It is understood that the type and architecture of the bus systems 110 may vary, depending on the type and architecture of the particular processing units, or the processors 106 and/or the processing cores 108.

The desktop and server systems 102 may also include one or more instances of computer-readable storage media 112, which couple to the bus systems 110. The bus systems may enable the processing units 104 to read code and/or data to and/or from the storage media 112. The media 112 may represent storage elements implemented using any suitable technology, including but not limited to semiconductors, magnetic materials, optics, or the like. The media 112 may include memory components, whether classified as RAM, ROM, flash, or other types, and may also represent hard disk drives.

The storage media 112 may include one or more data structures and modules of instructions that, when loaded into the processing units 104 and executed, cause the desktop and server systems 102 to perform various tools and techniques relating to multi-threaded processes for opening and saving documents. Examples of these modules may include application software 114. Examples of this application software may include word processing software, spreadsheet software, database management systems, presentation software, and the like.

In general, application software 114 may be responsive to user input to create new documents, as well as for editing, revising, or otherwise modifying existing documents. Mass storage devices 116 may contain any number of such documents, with examples of the mass storage devices including hard disk drives, solid-state drives, or other suitable storage systems.

The storage media 112 may include a set of modules that provide a load process 118 for reading one or more documents 120 from the mass storage device 116, and loading these documents 120 to the applications 114, as denoted generally at 122. For example, the processing units 104 may initiate the load process 118 in response to user input that selects a given document 120 for editing within the application 114.

The storage media 112 may also include a set of modules that provide a save process 124 for reading documents 126 from the application 114, and storing these documents in the mass storage device 116, as denoted generally at 128. In example scenarios, the processing units 104 may initiate the save process 124 in response to user input activating a "save" icon, or other similar user interface (UI) tool, as provided by the application 114.

In some implementation scenarios, the load process 118 and/or the save process 124 may be integrated into, and distributed with, the application 114. In other cases, the load process 118 and/or the save process 124 may be implemented as part of an operating system (not shown) included within the storage media 112. In other cases, these processes 118 and/or 124 may be implemented as part of a utility, middleware, or other components that interact with operating systems or application software.

Having described the overall systems or operating environments 100 and FIG. 1, the discussion now turns to a more detailed description of the load process. This description is now provided with FIG. 2.

Figure 2:
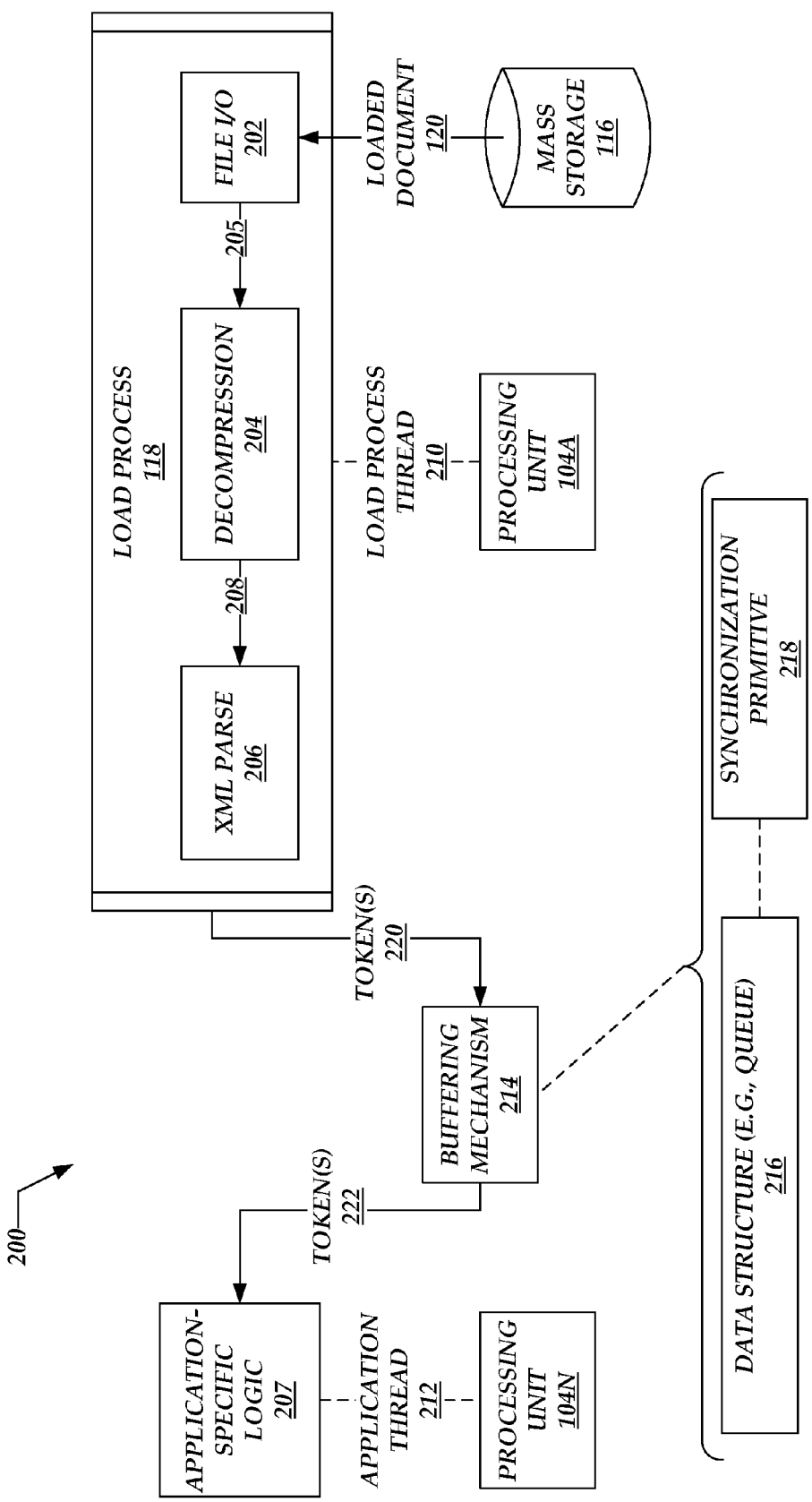
FIG. 2 is a combined block and flow diagram illustrating additional components and data flows relating to a load process, as shown in FIG. 1.

FIG. 2 illustrates additional components and data flows, denoted generally at 200, relating to the load process shown in FIG. 1. For convenience of description, but not to limit possible implementations, FIG. 2 may carry forward some elements from previous drawings, and denote them with identical reference numbers. For example, FIG. 2 carries forward examples of the application 114, the load process 118, and the mass storage device 116.

Turning to FIG. 2 in more detail, as described above in FIG. 1, the load process 118 may operate generally to read or load a document (e.g., 120) from the mass storage device 116, and provide it to the application 114. As shown in FIG. 2, the load process 118 may include a file input/output (I/O) process 202, which is responsible for handling the relatively low details involved in interacting with the mass storage device 116.

In some cases, the mass storage device 116 may store the documents 120 in compressed format. In these cases, the load process 118 may also include a decompression process 204, for receiving compressed input 205 from the file I/O process 202. The decompression process 204 may decompress the compressed input 205 using an appropriate decompression algorithm, depending on which algorithm was used to compress the document 120 when loading it into the mass storage device 116. For example, the decompression process 204 may use Lempel-Ziv-Welch (LZW) compression, although different compression/decompression techniques may be appropriate in different implementations.

In cases in which the mass storage device 116 stores the document 120 in extensible markup language (XML) format, the load process 118 may include an XML parse process 206 for receiving decompressed XML input from the decompression process 204. The XML parse process 206 may generate as output the document 122, as received by the application 114.

In the example shown in FIG. 2, the load process 118 and its constituent sub-processes 202, 204, and 206 are treated as one logical component, with these sub-processes 202-206 operating across variety of different applications. One or more modules 207 may contain logic specific to the application 114, and may be treated as another logical component. In such scenarios, processing performed by the application 114 may consume a significant portion of the overall processing burden associated with loading the document 120, as compared to the processing performed by the load process 118. However, it is noted that in different implementation scenarios, the load process 118 (and portions thereof) and the application 114 may consume different relative portions of the overall processing burden. Therefore, portions of the load process 118 and the application 114 may be treated as any number of different logical components, with the two logical components shown in FIG. 2 understood as illustrative, rather than limiting.

In this example, a load process 210 may be spawned for the load process 118, and assigned for execution within the processing unit 104a. The processing unit 104a may be a dedicated processing core in a multi-core CPU (e.g., 108 in FIG. 1), or may be a dedicated processor (e.g., 106 in FIG. 1) in a multi-processor scenario.

An application thread 212 may be spawned for the application 114, and assigned for execution within the processing unit 104n. As with the processing unit 104a, the processing unit 104n may be a dedicated processing core in a multi-core CPU (e.g., 108 in FIG. 1), or may be a dedicated processor (e.g., 106 in FIG. 1) in a multi-processor scenario.

The load process thread 210 and the application thread 212 may operate independently of one another, and may communicate with one another through a buffering mechanism 214. In general, the buffering mechanism 214 may provide for inter-process communications between the load process thread 210 executing on the processing unit 104a, and the application thread 212 executing on the processing unit 104n. The buffering mechanism 214 may include one or more suitable data structures 216, with these data structures including (in some cases) queue mechanisms. More specifically, the data structures 216 may take the form of circular queues, linked lists of buffers, or other suitable structures. In addition, the buffering mechanisms 214 may also include synchronization primitives 218 for regulating access to the data structures 214.

Turning to the load process thread 210, as it executes over time, it may generate tokens 220 to be passed to the application thread 212 through the buffering mechanism 214. When the load process thread 210 has one or more tokens 220 available for output, it may request access to the data structure 216 through the synchronization primitive 218. Once the load process thread 210 is granted access to the data structure 216, this thread 210 may load the tokens 220 into the buffering mechanism 214.

Turning to the tokens 220 in more detail, these tokens may correspond to one or more expanded strings. For example, in some scenarios, a given thread (e.g., a producer thread 602 shown and described in FIG. 6 below) may tokenize input stored into the buffering mechanism 214, particularly in cases involving string data. In these scenarios, the given thread may define string tables or other mechanisms that map relatively lengthy strings to shortened tokens or other identifiers. Generally, these tokens are much shorter length than the corresponding strings. Rather than passing the lengthy strings through the buffering mechanism between threads, the threads may pass the tokens through the buffering mechanism. These techniques may provide a mechanism for compressing the strings in-memory on the fly, and may reduce the amount of data exchanged between threads without incurring additional overhead.

In turn, the application thread 212 may read tokens 222 from the buffering mechanism 214. Like the load process thread 210, the application thread 212 may request access to the buffering mechanism 214 through the synchronization primitive 218.

Having described the synchronization primitive 218, it is noted that, in some cases, using the synchronization primitives 218 for each read/write operation may not allow the buffering mechanism 214 to provide favorable processing throughput at all times. Accordingly, some implementations of the buffering mechanism 214 may provide "safe regions."

In such implementations, a given thread (e.g., the load process thread 210) may be associated with a particular safe region, which represents a part of the buffer to which this thread can safely read/write, without contention from other threads within this safe region. For example, the given thread may calculate its safe region. More generally, processes for calculating safe regions may use the synchronization primitives 218.

Once the given thread is associated with its safe region, the thread may read/write to its safe region without using any type of synchronization. However, once the thread has finished reading/writing the region, the thread may release it for access by one or more other threads (e.g., the application thread 212). The given thread may use the synchronization primitive 218 to release its safe region. In turn, the other threads may access the safe zone that the previous thread formerly accessed exclusively. In general, synchronization involves some amount of overhead, and reducing the synchronization performed by the threads may increase the performance of the buffering mechanism as a whole.

The above examples provide scenarios involving multi-core or multi-processor systems. However, the tools and techniques described herein may also be performed on single-core machines, to improve performance by grouping similar activities. For example, assume that the load process 118 is processing an XML structure on a single-core machine. Instead of processing each XML node and passing the results to the application module individually, the load process 118 may buffer content related to processing a plurality of the XML nodes into the mechanism 214. When the mechanism 214 contains some level of content (e.g., becomes full), the mechanism may dispatching the content to the application module. This approach may offer increased efficiency, even on single-core systems as compared to dispatch every node individually. More specifically, this approach may provide improved locality between code and data, in that the processor (or processors) execute the same code and use the same data for a longer time, thus this data is "hot".

Having described the components and data flows 200 relating to the load process in FIG. 2, the discussion now proceeds to a description of pipeline structures or architectures for the load process thread and the application thread. This description is now provided with FIG. 3.

Figure 3:
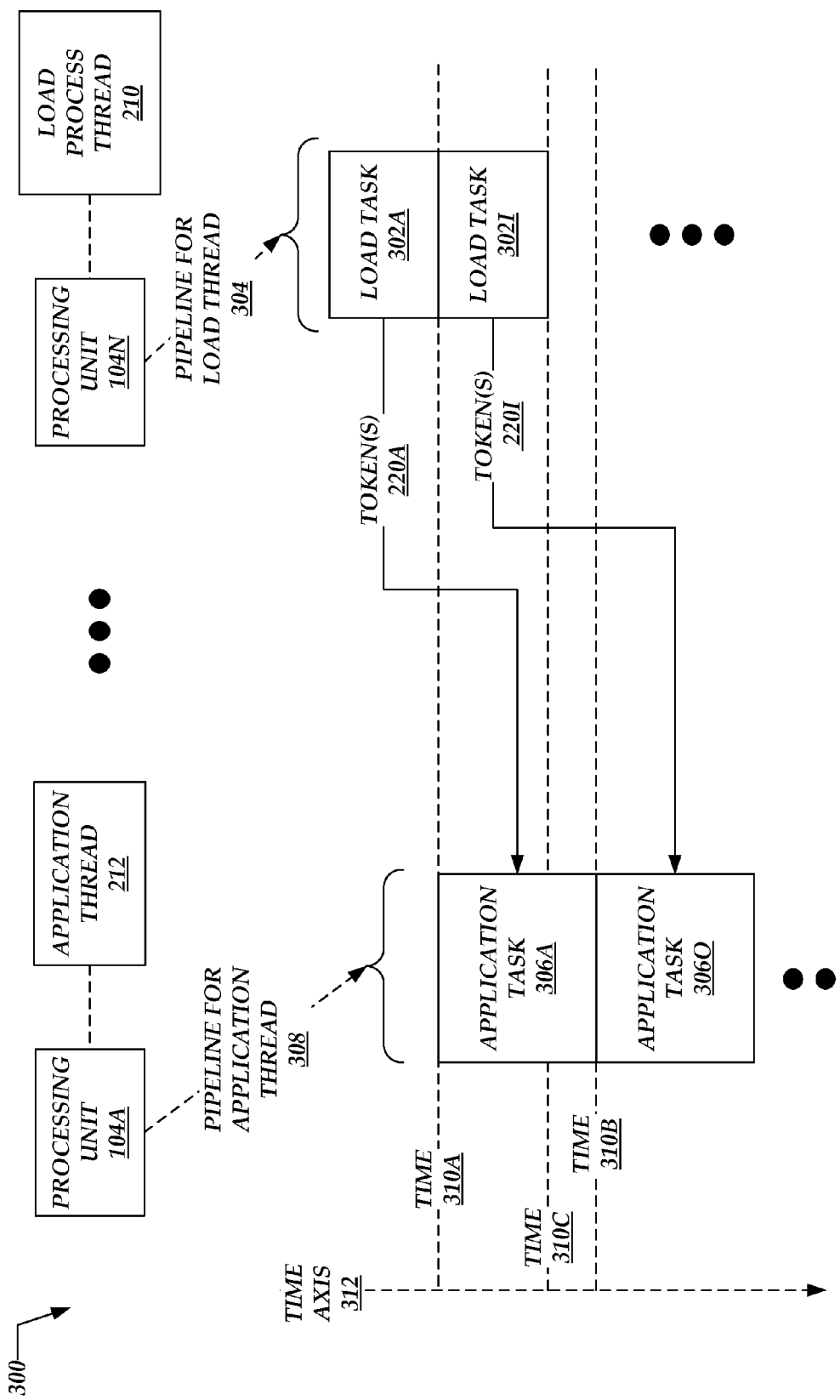
FIG. 3 is a diagram illustrating components and data flows related to pipeline structures or architectures for a load process thread and an application thread, as shown in FIG. 2.

FIG. 3 illustrates components and data flows, denoted generally at 300, related to pipeline structures or architectures for the load process thread and the application thread, as illustrated in FIG. 2. For convenience of description, but not to limit possible implementations, FIG. 3 may carry forward some elements from previous drawings, and denote them with identical reference numbers. For example, FIG. 3 carries forward examples of the application thread 212, as executing on the processing unit 104a, as well as the load process thread 210 executing on the processing unit 104n.

Turning to FIG. 3 in more detail, the load process thread 210 may execute any number of discrete tasks 302a and 302i (collectively, load tasks 302) in connection with performing the load process 118 as shown in FIG. 2. For example, the load process 118 may include tasks or subtasks associated with performing file I/O, decompression, parsing, and the like. A pipeline structure or architecture 304 may organize these load tasks 302 into a sequence for execution. More specifically, the tasks or subtasks within the pipeline 304 (e.g., file I/O, decompression, parsing) may operate as sequential layers in the pipeline, with the last layer in the sequence emitting tokens 220a and 220i, as described in more detail below.

In addition, the pipelines may contain multiple layers that run within multiple threads. Depending on the workload at a given time, and the processors/cores available at that time, multiple layers or sub-tasks within the pipeline may run sequentially on the same thread. The decisions on where to run particular tasks may be made at run-time, rather than when the systems are designed, thereby enabling the tools described herein to scale on various types of different hardware.

For the purposes of this description, but not to limit possible implementations, the term "pipeline" may refer to separate processing performed by two or more independent algorithms. In these algorithms, the output of one algorithm (i.e., a piece of pipeline running one thread) becomes input for the other algorithm (i.e., next piece of pipeline running another thread). Pipelines may be executed with any number of processing threads, generalizing beyond the two-thread example described here. In addition, pipelines may be broken into multiple stages.

The application thread 212 may similarly execute any number of discrete tasks 306a and 306o (collectively, application tasks 306) in connection with operating the application 114 as shown in FIG. 2. A pipeline structure or architecture 308 may organize these application tasks 306 into a sequence for execution.

Turning to the load tasks 302 in more detail, in the example shown in FIG. 3, the load task 302a may execute first, and may finish executing at an arbitrary time 310a, defined relative to a time axis 312. When the load task 302a completes execution, it may generate a first set of one or more tokens 220a as output. These tokens 220a may pass to the application thread 212 through the buffering mechanism 214 (omitted from FIG. 3 for clarity).

At the pipeline 308, the application task 306a may receive the tokens 220a output from the load task 302a, and begin execution at approximately the time 310a. The term "approximately" as used herein to account for any propagation delays through the buffering mechanism 214, communication delays, or other factors that may cause the application task 306a not to start immediately at the time 310a. The application task 306a may continue executing for an arbitrary period of time, until concluding at the time 310b.

Referring back to the load pipeline 304, once the load task 302a has completed processing at the time 310a, the next load task 302i may begin execution. This load task 302i may execute for an arbitrary amount of time, until completing at the time 310c. It is noted that the load task 302i may execute within the load thread pipeline 304 at least partially in parallel with the application task 306a executing within the application pipeline 308. Accordingly, even if the application task 306a takes longer to complete than the load task 302a, the load thread pipeline 304 may nevertheless proceed with performing the load task 302i, as well as any subsequent load tasks 302 (not shown). In this manner, the load tasks within the pipeline 304 may operate in parallel, and independently from, the application tasks 306 in the pipeline 308.

Once the load task 302i completes, it may generate another set of tokens 220i as output to the pipeline 308. Referring to the pipeline 308, the application task 306o may receive the tokens 220i as input. In turn, the application task 306o may begin execution at approximately the time 310b, or otherwise as soon as practicable after the application task 306a completes.

It is noted that the load tasks 302a and 302i (collectively, load tasks 302) may output the tokens 220 as they process input. For example, in some cases, the load tasks 302 may not be subdivided into sub-tasks. In these cases, the load tasks may execute over some period of time, generating and outputting tokens 220 continuously over this time, rather than outputting the tokens all at once after the tasks complete.

FIG. 3 illustrates two examples of the load tasks 302 and the application tasks 306 only for the purposes of clarity in illustrating the interactions between the elements within the pipelines 304 and 308. However, it is noted that the scenario shown in FIG. 3 may be extended to processing any number of pipelines 304 or 308, as well as any number of tasks 302 or 306 included within those pipelines.

Having described the various aspects related to the load process in FIGS. 2 and 3, the discussion now proceeds to a similar description of various aspects related to the save process shown in FIG. 1. This description is now provided with FIGS. 4 and 5.

Figure 4:
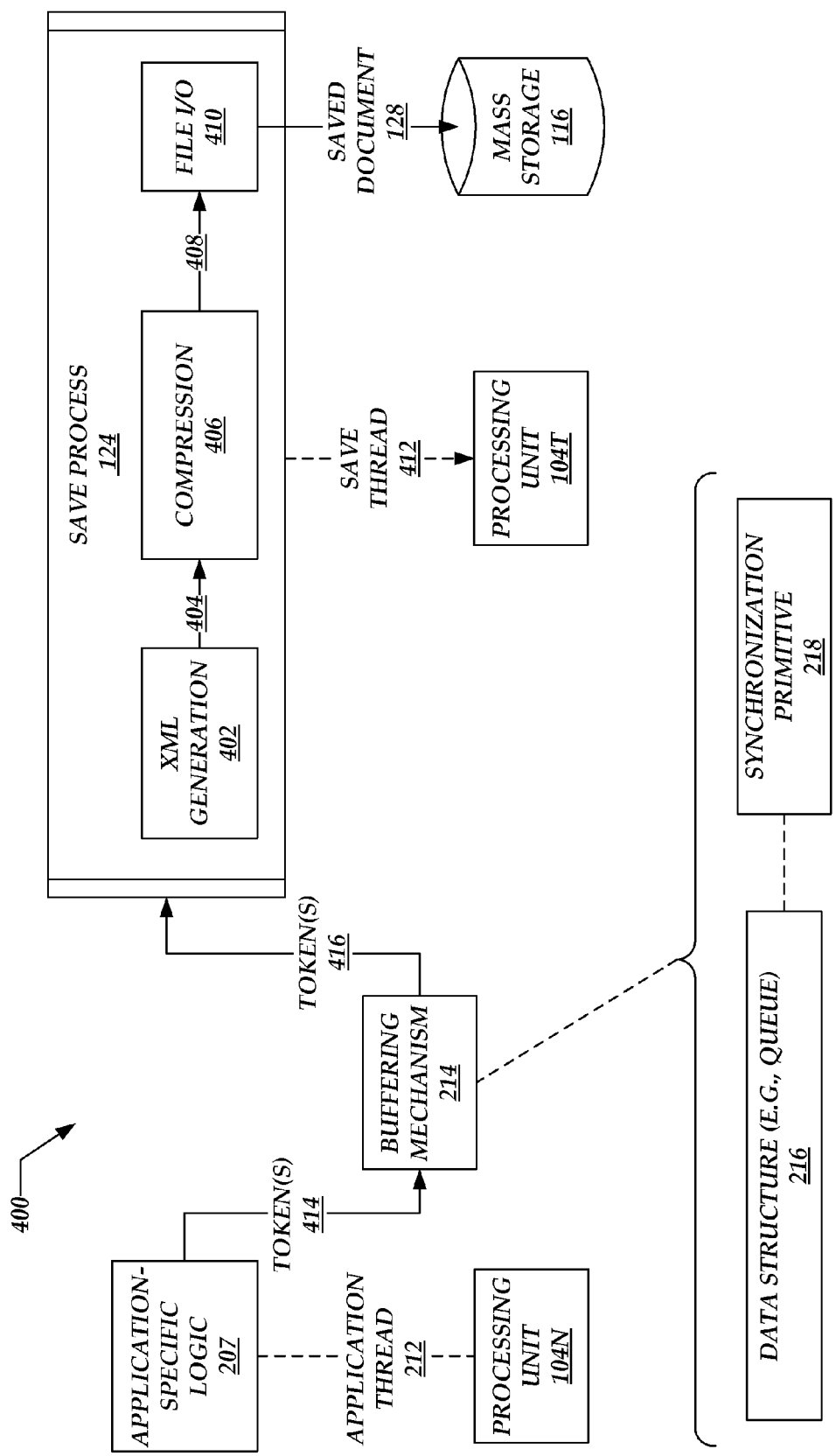
FIG. 4 is a combined block and flow diagram illustrating components and data flows related to a save process, as shown in FIG. 1.

FIG. 4 illustrates components and data flows, denoted generally at 400, related to the save process shown in FIG. 1. For convenience of description, but not to limit possible implementations, FIG. 4 may carry forward some elements from previous drawings, and denote them with identical reference numbers. For example, FIG. 4 carries forward examples of the application 114, the save process 124, and the mass storage devices 116. FIG. 4 also carries forward an example application thread 212, which may execute on the processing unit 104n, as described and illustrated above in FIG. 2.

Turning to FIG. 4 in more detail, as the application 114 executes over time to edit or modify the document 120 loaded from the mass storage device 116, the application may receive save commands, close commands, exit commands, or any other similar input from a user (not shown). In general, this input may involve storing or writing the edited or modified document back to the mass storage device 116, or another mass storage device.

In response to such save commands, the save process 124 may be initiated. Turning to the save process 124 in more detail, in cases in which the mass storage device 116 stores the saved document 128 in XML format, the save process 124 may include an XML generation component 402. The XML generation component 402 may receive the document 126 from the application 114, and generate corresponding XML markup 404.

In cases in which the mass storage device 116 stores the saved document 128 in compressed format, the save process 124 may include a compression process 406. The compression process 406 may receive the XML markup 404, and compress it as represented generally at 408. In turn, the save process 124 may include a file I/O process 410, for handling relatively low-level details relating to storing or saving the document 128 to the mass storage device 116.

A thread 412 may respond to execute various tasks associated with the save process 124 on a processing unit 104t. This processing unit 104t may or may not be the same as the processing unit 104a shown in FIG. 2 (i.e., the processing unit on which the load process thread 210 executed).

Turning to the application thread 212 in more detail, it may execute on the processing unit 104n, and generate any number of tokens 414 as output. When the application thread 212 has tokens 414 available, the thread 212 may request access to the data structure 216 through the buffering mechanism 214. More specifically, the application thread 212 may request access to the data structure 216 through the synchronization primitive 218. When the synchronization primitive 218 grants the application thread 212 access to the data structure 216, the thread 212 may write the tokens 414 into the buffering mechanism 214. In turn, the save thread 412 may read corresponding tokens 416 from the buffering mechanism 214, after having contended for access to the buffering mechanism through the synchronization primitive 218.

Having described the components and data flows 400 associated with the save process in FIG. 4, the discussion now turns to a description of pipeline structures or architectures associated with executing application thread and the save process thread.

Figure 5:
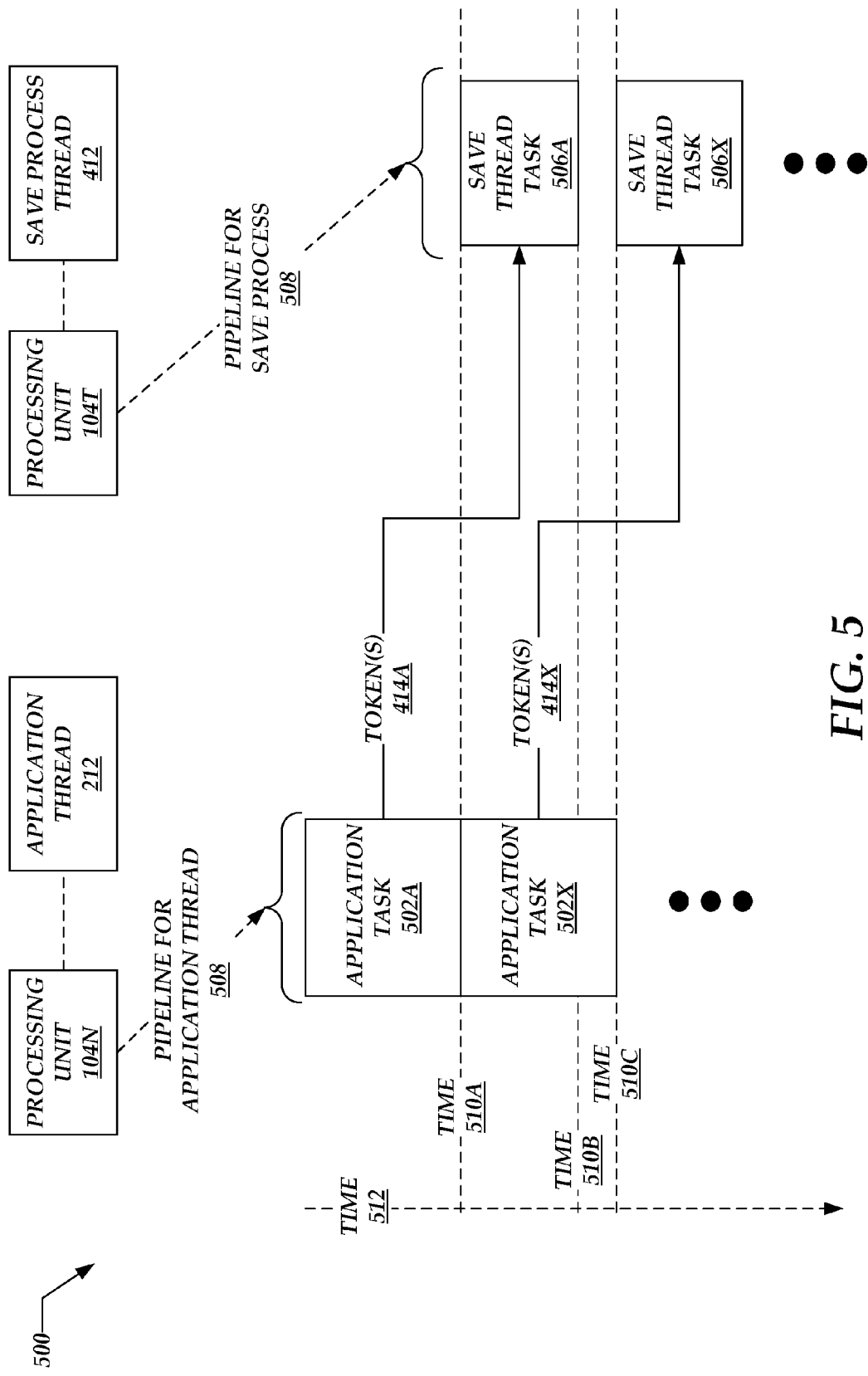
FIG. 5 is a diagram illustrating components and data flows related to pipeline structures or architectures for an application thread and a save process thread, as shown in FIG. 4.

FIG. 5 illustrates components and data flows, denoted generally at 500, related to pipeline structures or architectures for the application thread and the save process thread, as illustrated in FIG. 4. For convenience of description, but not to limit possible implementations, FIG. 5 may carry forward some elements from previous drawings, and denote them with identical reference numbers. For example, FIG. 5 carries forward representations of the processing unit 104n executing the application thread 212, as well as the processing unit 104t executing the save process thread 412.

Turning to FIG. 5 in more detail, the application thread 212 may execute any number of discrete tasks 502a and 502x (collectively, application tasks 502) in connection with operating the application 114 as shown in FIG. 4. A pipeline structure or architecture 504 may organize these application tasks 502 into a sequence for execution on the processing unit 104n.

Turning to the save process thread 412, this thread 412 may include any number of tasks or subtasks 506a and 506x(collectively, save tasks 506) associated with generating XML, compressing file content, performing file I/O operations, and the like. A pipeline structure or architecture 508 may organize these save tasks 506 into a sequence for execution.

Turning to the application tasks 502 in more detail, in the example shown in FIG. 5, the application tasks 502a may execute first, and may finish executing at an arbitrary time 510a, defined relative to a time axis 512. While the application task 502 is executing, or when the application task 502a completes execution, it may generate a first set of one or more tokens 414a as output. These tokens 414a may pass to the save process thread 412 through the buffering mechanism 214 (omitted from FIG. 5 for clarity).

At the pipeline 508, the save process task 506a may receive the tokens 414a output from the application task 502a, and begin execution at approximately the time 510a. The term "approximately" as used herein to account for any propagation delays through the buffering mechanism 214, communication delays, or other factors that may cause the save task 506a not to start immediately at the time 510a. The save task 506a may continue executing for an arbitrary period of time, until concluding at the time 510b.

Referring back to the application thread pipeline 504, once the application task 502a has completed processing at the time 510a, the next application task 502x may begin execution. This application task 502x may execute for an arbitrary amount of time, until completing at the time 510c. It is noted that the application task 502x may execute within the application thread pipeline 504 at least partially in parallel with the save thread task 506a executing within the save thread pipeline 508. Accordingly, even if the save thread task 506a takes longer to complete than the application thread task 502a, the application pipeline 504 may nevertheless proceed with performing the application task 502x, as well as any subsequent application tasks 502 (not shown). In this manner, the application tasks 502 within the pipeline 504 may operate in parallel, and independently from, the save thread tasks 506 in the pipeline 508.

While the application task 502x is running, or once the application task 502x has completed, it may generate another set of tokens 414x as output to the pipeline 508. Referring to the pipeline 508, the save task 506x may receive the tokens 414x as input. In turn, the save task 506x may begin execution at approximately the time 510c, or otherwise as soon as practicable after the application task application task 502x completes.

It is noted that FIG. 5 illustrates two examples of the application tasks 502 and the save tasks 506 only for the purposes of clarity in illustrating the interactions between the elements within the pipelines 504 and 508. However, it is noted that the scenario shown in FIG. 5 may be extended to processing any number of pipelines 504 or 508, as well as any number of tasks 502 or 506 included within those pipelines.

Having described the pipeline structures or architectures associated with the application thread and the save process threads in FIG. 5, the discussion now turns to a description of process flows that may be performed by different threads in connection with multi-threaded processes for opening and saving documents. This description is now provided with FIG. 6.

Figure 6:
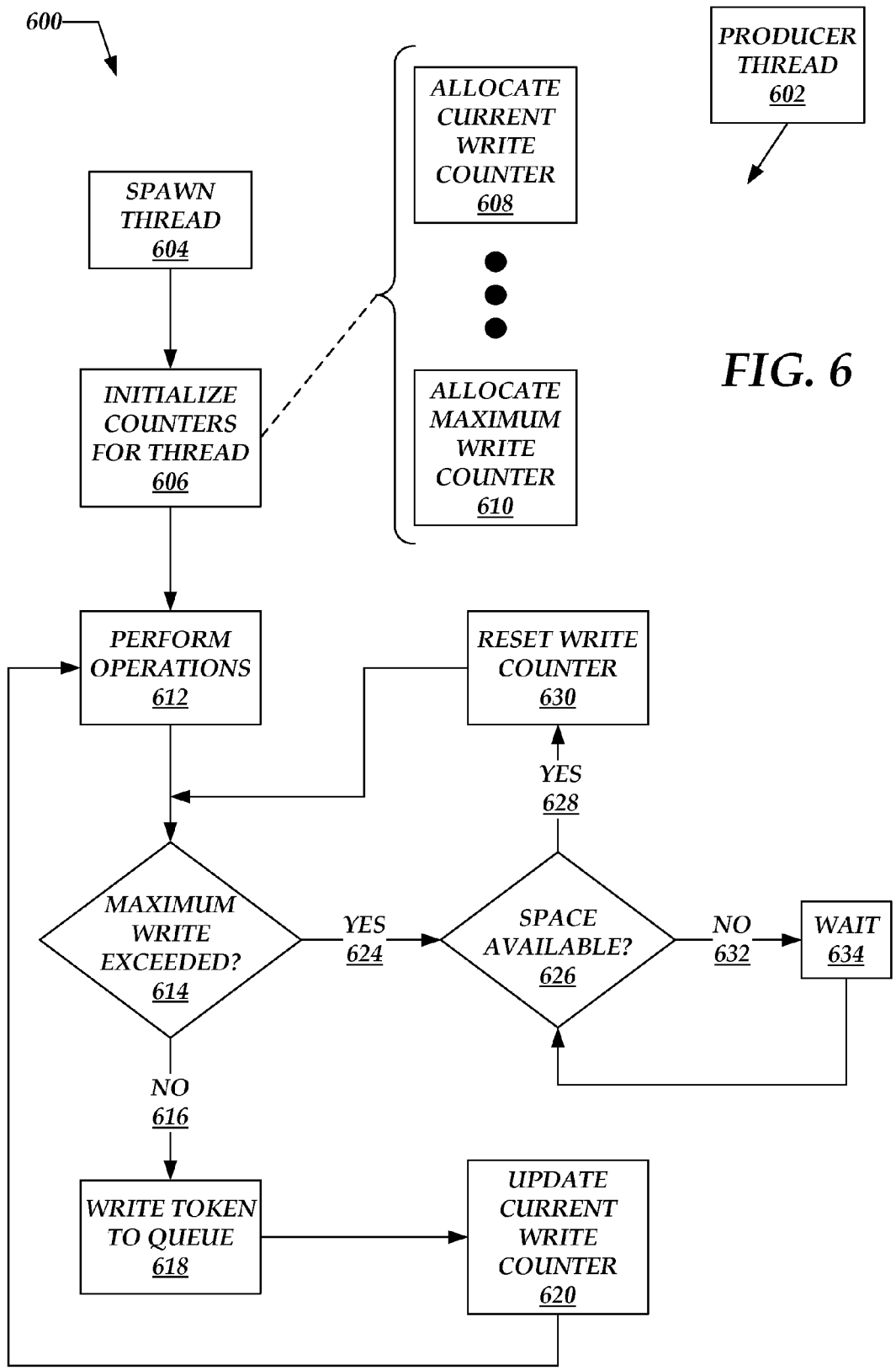
FIG. 6 is a flow chart illustrating processes for providing multi-threaded processes for opening and saving documents, as performed by a producer thread.
Figure 7:
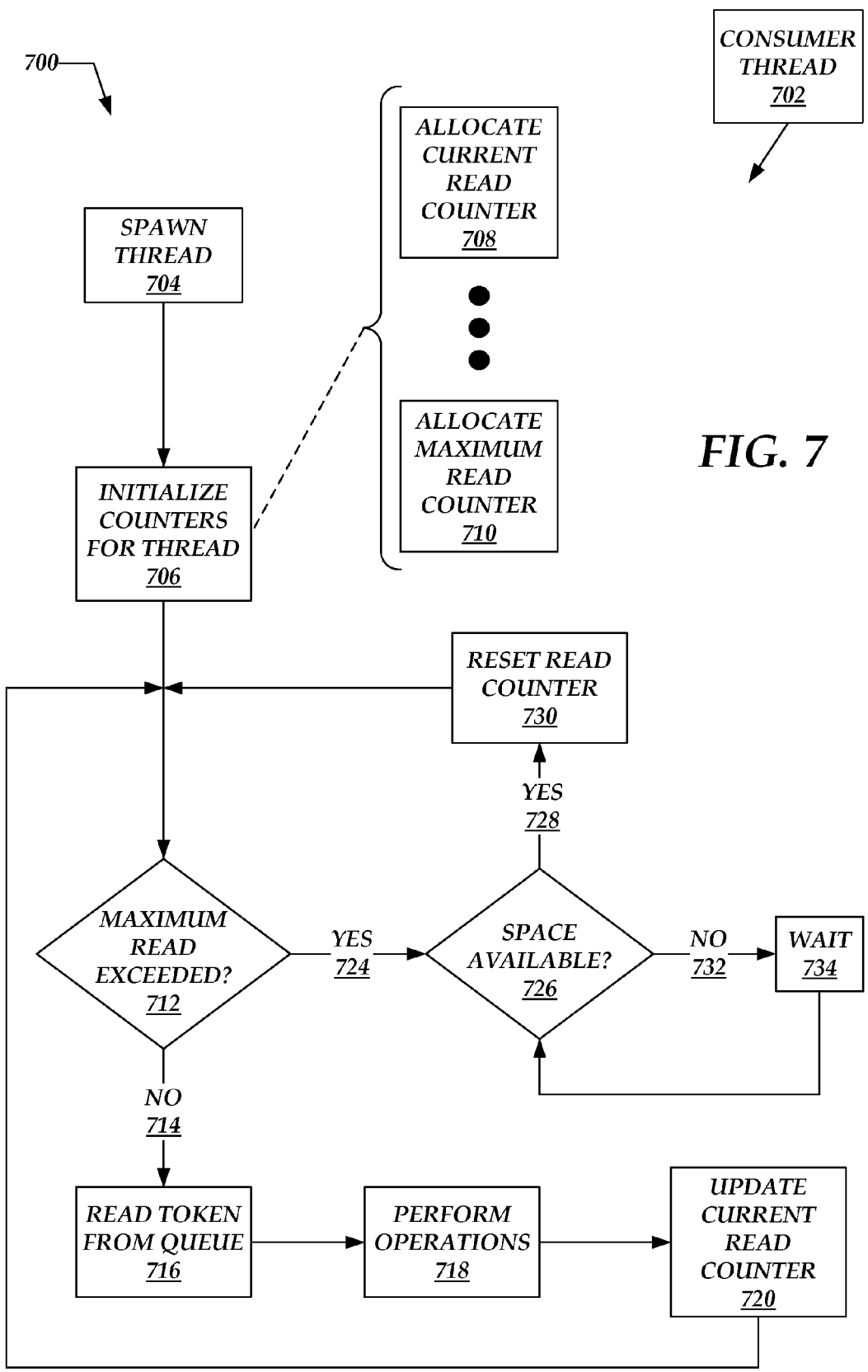
FIG. 7 is a flow chart illustrating processes for providing multi-threaded processes for opening and saving documents, as performed by a consumer thread.

FIG. 6 illustrates process flows, denoted generally at 600, related to providing multi-threaded processes for opening and saving documents. For purposes of this description, but not to limit possible implementations, the process flows 600 are illustrated and described in connection with a "producer" thread 602. The producer thread 602 may represent the load process thread 210 as shown in FIG. 2, or the application thread 212 as shown in FIG. 4. Put differently, these two thread examples generate tokens that are consumed by other threads, namely the application thread 212 as shown in FIG. 2, and the save thread 412 shown in FIG. 4. FIG. 7, described below, illustrates process flows associated with these consumer threads.

Implementations of this description may perform at least portions of the process flows 600 using other components, without departing from the scope and spirit of this description. In addition, these process flows are described as proceeding in certain orders only for purposes of this description, and implementations of these process flows may proceed in different orders as well.

Turning to the process flows 600 in more detail, block 604 represents spawning or starting a new instance of the producer thread 602. For example, block 604 may include spawning or creating an instance of the load process thread 210 shown in FIG. 2, or the application thread 212 as operating in FIG. 4.

Block 606 represents initializing a set of counters associated with the user thread 602 that was spawned in block 604. In general, these counters enable a buffering mechanism (e.g., 214 in the drawings above) to regulate access by producer and consumer threads to a data structure shared between the threads. FIG. 2 provides an example of such a data structure at 216. More specifically, block 606 represents defining a window within the data structure 216 to which the producer thread may write.

Block 606 may include allocating a current write counter to the producer thread 602, as represented generally at block 608. The current write counter specifies a location within the shared data structure (e.g., 216) to which the producer thread is to write its next set of tokens. When the producer thread 602 is initially spawned, the current write counter may direct the producer thread to write to the beginning of the window allocated to the producer thread.

Block 606 may also include allocating a maximum write counter to the producer thread 602, as represented generally at block 610. The maximum write counter specifies where the window allocated to the producer thread ends, and specifies a maximum extent to which the producer thread may write. In general, the current write counter allocated in block 608 may fall anywhere within the window allocated to the producer thread, and may assume a maximum value as specified by the maximum write counter.

Block 612 generally represents the producer thread performing any number of tasks, subtasks, or other actions (collectively, operations). In some examples, block 612 may represent the load process thread 210 performing any of the actions represented in blocks 202, 204, and/or 206 in connection with reading and loading a file into the application 114. In other examples, block 612 may represent the application thread 212 as shown in FIG. 4 performing save operations in response to user input.

Block 612 may represent the producer thread 602 generating tokens (e.g., 220 or 414) at various times, and making these tokens available to consumer threads. When such tokens become available from the producer threads, the process flows 600 may proceed to decision block 614. Block 614 represents determining whether the counter associated with the producer thread has reached its maximum write value, as allocated in block 610.

From decision block 614, if the producer thread has not reached its maximum write counter, the process flows 600 may take No branch 616 to block 618, which represents writing the token to a buffering mechanism (e.g., 214 in FIG. 2). For example, block 618 may include writing the available tokens to a queue or other suitable data structure maintained by the buffering mechanism 214. More specifically, block 618 may include writing the token to a location in the queue specified by the current write pointer, as established by block 608. Block 618 may also include requesting access to the buffering mechanism 214 through, for example the synchronization primitive 218.

Block 620 represents updating the current write pointer for the producer thread. In this manner, when the next set of tokens becomes available from the producer thread, the thread will write to the next available location within the queue, in the next iteration through the process flows 600.

Returning to decision block 614, if the producer thread 602 cannot write additional tokens because there is no empty space in the buffer window associated with the producer thread, the process flows 600 may take Yes branch 624 to decision block 626. Decision block 626 represents determining whether space is available within the window allocated to the producer thread. For example, even though the current write pointer associated with the producer thread 602 may have reached its maximum value, other consumer threads may have already read tokens from the write window that the producer thread wrote previously. If consumer threads have read these previously-written tokens, then the window space storing these previously-written tokens may be "reclaimed" and overwritten with new tokens.

From decision block 626, if space is available within the window allocated to the producer thread, the process flows 600 may take Yes branch 628 to block 630. Block 630 represents resetting the write counter to direct the producer thread 602 to write to space within the window that may be reclaimed and overwritten. In turn, the process flows 600 may loop back to repeat the test represented in decision block 614.

From decision block 626, if no space is yet available for reclamation within the window allocated to the producer thread, the process flows may take No branch 632 to wait state 634. Wait state 634 may include a given thread (e.g., the producer thread 602) going to sleep, and blocking on a synchronization primitive (e.g., an event primitive). However, once the producer thread 602 goes into the wait state 634, another thread (e.g., a consumer thread described in FIG. 7) may awaken it. Thus, both threads check periodically whether any other threads are to be awakened. For example, once the producer thread 602 is finished writing to its window (which is part of the buffer), the producer thread 602 may update its counters, so other threads see this data as available for further processing. Thus, block 626 may include checking that other threads are in running states, and waking them, as appropriate. In addition, the wait state 634 may include allowing only one thread to enter a sleep mode. From the wait state 634, the producer thread 602 may loop to and from decision block 626, until space within the window becomes available for reclamation and overwriting.

For ease of description only, the process flows 600 are described in connection with a given producer thread 602. However, it is noted that implementations of the process flows 600 may be performed concurrently with any number of producer threads 602. More specifically, assuming that multiple threads (e.g., N threads) are operating at a given time, a given thread X (if X>1) may be a consumer thread for thread X−1. Further, the given thread X (if X<N) may be a producer for thread X+1.

Having described the process flows 600 performed by the producer thread 602, the discussion now turns to a description of process flows are formed by a consumer thread. This description is now provided with FIG. 7.

FIG. 7 illustrates process flows, denoted generally at 700, related to providing multi-threaded processes for opening and saving documents. For purposes of this description, but not to limit possible implementations, the process flows 700 are illustrated and described in connection with a "consumer" thread 702. The consumer thread 702 may represent the application thread 212 as shown in FIG. 2, and the save thread 412 shown in FIG. 4. Put differently, these two thread examples consume tokens that are generated and output by other threads, namely the load process thread 210 as shown in FIG. 2, and the application thread 212 shown in FIG. 4. FIG. 7, described below, illustrates process flows associated with these consumer threads.

Implementations of this description may perform at least portions of the process flows 700 using other components, without departing from the scope and spirit of this description. In addition, these process flows are described as proceeding in certain orders only for purposes of this description, and implementations of these process flows may proceed in different orders as well.

Turning to the process flows 700 in more detail, block 704 represents spawning or starting a new instance of the consumer thread 702. For example, block 704 may include spawning or creating an instance of the application thread 212 shown in FIG. 2, or the save process thread 412 as operating in FIG. 4.

Block 706 represents initializing a set of counters associated with the consumer thread 702 that was spawned in block 704. In general, these counters enable a buffering mechanism (e.g., 214 in the drawings above) to regulate access by producer and consumer threads to a data structure shared between the threads. FIG. 2 provides an example of such a data structure at 216. More specifically, block 706 represents defining a window within the data structure 216 from which the consumer thread may read.

Block 706 may include allocating a current read counter to the consumer thread 702, as represented generally at block 708. The current read counter specifies a location within the shared data structure (e.g., 216) from which the consumer thread is to read its next set of tokens. When the consumer thread 702 is initially spawned, the current read counter may direct the consumer thread to read from the beginning of the window allocated to the consumer thread.

Block 706 may also include allocating a maximum read counter to the consumer thread 702, as represented generally at block 710. The maximum read counter specifies where the window allocated to the consumer thread ends, and specifies a maximum extent from which the consumer thread may read. In general, the current read counter allocated in block 708 may fall anywhere within the window allocated to the consumer thread, and may assume a maximum value as specified by the maximum read counter.

Decision block 712 represents determining whether the counter associated with the consumer thread has reached its maximum read value, as allocated in block 710. From decision block 712, in the first pass through the process flows 700 after the consumer thread has been spawned, or afterwards if the consumer thread has not reached its maximum read counter, the process flows 700 may take No branch 714 to block 716, which represents reading the token from a buffering mechanism (e.g., 214 in FIG. 2). For example, block 716 may include reading the available tokens from a queue or other suitable data structure maintained by the buffering mechanism 214. More specifically, block 716 may include reading the token from a location in the queue specified by the current read pointer, as established by block 708. Block 716 may also include requesting access to the buffering mechanism 214 through, for example the synchronization primitive 218.

Block 716 may represent the consumer thread 702 receiving tokens (e.g., 222 or 416) at various times from producer threads. When such tokens become available from the producer threads, the process flows 700 may proceed to block 718.

Block 718 generally represents the consumer thread performing any number of tasks, subtasks, or other actions (collectively, operations), based on the tokens read in block 716. In some examples, block 718 may represent actions performed by the application-specific logic 207 in connection with launching or opening an application program. In other examples, block 718 may represent the save process thread 412 performing any of the actions represented in blocks 402, 404, and/or 410 in connection with saving a file from the application 114.

Block 720 represents updating the current read pointer for the consumer thread. In this manner, when the next set of tokens becomes available from the producer thread, the thread will read from the next available location within the queue, in the next iteration through the process flows 700.

Returning to decision block 714, if the current read window associated with the consumer thread 702 has reached its maximum value, the process flows 700 may take Yes branch 724 to decision block 726. Decision block 726 represents determining whether space is available within the window allocated to the consumer thread. For example, even though the current read pointer associated with the consumer thread 702 may have reached its maximum value, other producer threads may have written tokens to the read window from which the consumer thread read previously. If producer threads have written these previously-read tokens, then the window space storing these previously-read tokens may have been "reclaimed" and overwritten with new tokens.

From decision block 726, if space is available within the window allocated to the consumer thread, the process flows 700 may take Yes branch 728 to block 730. Block 730 represents resetting the read counter to direct the consumer thread 702 to read from space within the window that was reclaimed and overwritten with new tokens by a producer thread. In turn, the process flows 700 may loop back to repeat the test represented in decision block 714.

From decision block 726, if no space has yet been reclaimed within the window allocated to the consumer thread, the process flows may take No branch 732 to wait state 734. Wait state 734 may include a given thread (e.g., the consumer thread 702) going to sleep, and blocking on a synchronization primitive (e.g., an event primitive). However, once the consumer thread 702 goes into the wait state 734, another thread (e.g., the producer thread 602 described in FIG. 6) may awaken it. Thus, both threads check periodically whether any other threads are to be awakened. For example, once the consumer thread 702 is finished reading from its window (which is part of the buffer), the consumer thread 702 may update its counters, so other threads see this data as available for further processing. Thus, block 726 may include checking that other threads are in running states, and waking them, as appropriate. In addition, the wait state 734 may include allowing only one thread to enter a sleep mode. From the wait state 734, the consumer thread 702 may loop to and from decision block 726, until space within the window has been reclaimed and overwritten by, for example, a producer thread 602.

Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

In addition, certain process and data flows are represented herein as unidirectional only for the purposes of facilitating this description. However, these unidirectional representations do not exclude or disclaim implementations that incorporate bidirectional flows.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A computer-readable storage medium that is not a signal, the computer-readable storage medium having computer-executable instructions stored thereon that, when executed by a computer, cause the computer to:
   provide a load process for reading a document from a storage device and loading the document into an application;
   spawn a load process thread to execute the load process on a first processing core provided by a multi-core central processing unit;
   spawn an application thread to execute the application on a second processing core of the multi-core processing unit;
   create a first pipeline for executing the load process thread, wherein the first pipeline performs tasks associated with loading the document into the application;
   create a second pipeline for executing the application, wherein the second pipeline performs tasks associated with performing operations on the document, and wherein the first pipeline is configured to pass tokens as input to the tasks in the second pipeline;
   provide a circular queue for storing tokens from the first pipeline and to pass the tokens to the tasks in the second pipeline; and provide a synchronization primitive for regulating access to the circular queue.

2. The storage medium of claim 1, wherein the instructions for spawning the load process thread include instructions for spawning the load process thread for executing on a first processor provided by a multiprocessor system, and wherein the instructions for spawning the application thread include instructions for spawning the application thread for executing on a second processor provided by the multiprocessor system.

3. The storage medium of claim 1, wherein the tasks in the first pipeline operate separately and independently from the tasks in the second pipeline.

4. The storage medium of claim 1, wherein at least one of the tasks in the first pipeline operates in parallel with at least one of the tasks in the second pipeline.

5. The storage medium of claim 1, further comprising instructions for resolving at least one of the tokens to a string variable associated with opening the document.

6. The storage medium of claim 1, further comprising instructions for creating a third pipeline for executing the load process thread and for performing a plurality of tasks associated with reading the document from the storage device, and wherein the tasks in the second pipeline are configured to pass tokens as input to the tasks in the third pipeline.

7. A method comprising:
providing, at a computer, a load process for reading a document from a storage device and loading the document into an application executing at the computer;
spawning a load process thread to execute the load process on a first processing core provided by a multi-core processing unit at the computer;
spawning an application thread to execute the application on a second processing core of the multi-core processing unit at the computer;
creating a first pipeline for executing the load process thread, wherein the first pipeline performs tasks associated with loading the document into the application;
creating a second pipeline for executing the application, wherein the second pipeline performs tasks associated with performing operations on the document, and wherein the first pipeline is configured to pass tokens as input to the tasks in the second pipeline;
providing a circular queue for storing tokens from the first pipeline and to pass the tokens to the tasks in the second pipeline; and
providing a synchronization primitive for regulating access to the circular queue.

8. The method of claim 7, wherein spawning the load process thread comprises spawning the load process thread on a first processor, and wherein spawning the application thread comprises spawning the application thread on a second processor.

9. The method of claim 7, wherein the tasks in the first pipeline operate separately and independently from the tasks in the second pipeline.

10. The method of claim 7, wherein at least one of the tasks in the first pipeline operates in parallel with at least one of the tasks in the second pipeline.

11. The method of claim 7, further comprising resolving at least one of the tokens to a string variable associated with storing the document.

12. A computer storage medium that is not a signal, the computer storage medium having computer executable instructions stored thereon that, when executed by a computer, cause the computer to:
provide a load process for reading a document from a storage device and loading the document into an application;
spawn an application thread to execute the application on a first processing core of provided by a multi-core central processing unit;
spawn a load process thread to execute the load process on a second processing core of provided by a multi-core central processing unit;
create a first pipeline for executing the application thread and for performing a plurality of tasks associated with operating on the document;
create a second pipeline for executing the load process thread and for performing a plurality of tasks associated with loading the document from the storage device, wherein the tasks in the first pipeline are configured to pass tokens to the tasks in the second pipeline;
provide a circular queue to receive the tokens from the tasks in the first pipeline and to pass the tokens to the tasks in the second pipeline; and
provide a synchronization primitive to regulate access to the circular queue.

13. The computer storage medium of claim 12, wherein the tasks in the first pipeline operate independently from the tasks in the second pipeline.

14. The computer storage medium of claim 12, wherein at least one of the tasks in the first pipeline operates in parallel with at least one of the tasks in the second pipeline.

* * * * *